(12) United States Patent
Lau et al.

(10) Patent No.: US 11,297,118 B2
(45) Date of Patent: *Apr. 5, 2022

(54) DATA-PLAN-BASED QUALITY SETTING SUGGESTIONS AND USE THEREOF TO MANAGE CONTENT PROVIDER SERVICES

(71) Applicant: T-Mobile USA, Inc., Bellevue, WA (US)

(72) Inventors: Kevin Lau, Issaquah, WA (US); Warren J. McNeel, Issaquah, WA (US); Cristian Asandului, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/930,104

(22) Filed: Jul. 15, 2020

(65) Prior Publication Data

US 2020/0351318 A1 Nov. 5, 2020

Related U.S. Application Data

(60) Continuation of application No. 16/235,892, filed on Dec. 28, 2018, now Pat. No. 10,721,283, which is a
(Continued)

(51) Int. Cl.
*G06F 15/16* (2006.01)
*H04L 65/613* (2022.01)
(Continued)

(52) U.S. Cl.
CPC ...... *H04L 65/4092* (2013.01); *H04L 12/1407* (2013.01); *H04L 12/1432* (2013.01);
(Continued)

(58) Field of Classification Search
CPC ............. H04L 65/4092; H04L 12/1407; H04L 12/1432; H04L 65/80; H04L 67/20;
(Continued)

(56) References Cited

U.S. PATENT DOCUMENTS 5,794,140 A 8/1998 Sawyer
6,282,206 B1 8/2001 Hindus et al.
(Continued)

FOREIGN PATENT DOCUMENTS

CN 102461337 A 5/2012
CN 103152775 6/2013
(Continued)

OTHER PUBLICATIONS

Broida, "Force YouTube to Play HD Videos Every Time", retreived on Sep. 19, 2018 at <<https://www.pcworld.com/article/199532/Force_ YouTube_to_Piay_H D_ Videos_Every_ Time.html>>, PCWorld, Jun. 22, 2010.
(Continued)

*Primary Examiner* — Imad Hussain
(74) *Attorney, Agent, or Firm* — Lee & Hayes, P.C.

(57) ABSTRACT

A user device described herein suggests a change to a quality setting associated with the consumption of content from one or more content providers. The change is suggested based both on a user's data plan and on a service quality of content received by the user device. This user-selected quality setting is then provided to the telecommunication network, which reduces network resources available for transmission of the content based on the quality setting. Such reduced network resources cause the content providers to provide content at a service quality no greater than the quality setting. Also, the user may be presented with or defaulted to selecting an option for a program offering consumption of the video content free of charge when provided to the user
(Continued)

at a limited service quality. When the user participates, consumption of video content is then conditionally excluded from a consumption metric of the data plan.

20 Claims, 7 Drawing Sheets

Related U.S. Application Data division of application No. 14/936,495, filed on Nov. 9, 2015, now Pat. No. 10,193,943.

(51) Int. Cl.
| | | |
|---|---|---|
| *H04L 67/50* | (2022.01) | |
| *H04L 65/80* | (2022.01) | |
| *H04M 15/00* | (2006.01) | |
| *H04W 4/24* | (2018.01) | |
| *H04L 12/14* | (2006.01) | |
| *H04L 67/53* | (2022.01) | |
| *H04L 67/01* | (2022.01) | |

(52) U.S. Cl.
CPC .............. *H04L 65/80* (2013.01); *H04L 67/20* (2013.01); *H04L 67/22* (2013.01); *H04L 67/42* (2013.01); *H04M 15/66* (2013.01); *H04M 15/70* (2013.01); *H04M 15/705* (2013.01); *H04M 15/71* (2013.01); *H04M 15/72* (2013.01); *H04M 15/745* (2013.01); *H04M 15/8016* (2013.01); *H04W 4/24* (2013.01)

(58) Field of Classification Search
CPC ........ H04L 67/22; H04L 67/42; H04M 15/66; H04M 15/70; H04M 15/705; H04M 15/71; H04M 15/72; H04M 15/745; H04M 15/8016; H04W 4/24
USPC ........................................................ 709/203
See application file for complete search history.

(56) References Cited

U.S. PATENT DOCUMENTS

| | | | |
|---|---|---|---|
| 6,865,426 B1 | 3/2005 | Schneck et al. | |
| 7,840,667 B2 | 11/2010 | Weller et al. | |
| 8,174,970 B2 | 5/2012 | Adamczyk et al. | |
| 8,838,589 B1 | 9/2014 | Tam | |
| 9,648,173 B2 | 5/2017 | Cheuk et al. | |
| 9,762,635 B2 | 9/2017 | Sebastian et al. | |
| 9,769,643 B2 | 9/2017 | Baron et al. | |
| 9,860,136 B2 | 1/2018 | Ritter et al. | |
| 10,148,482 B2 | 12/2018 | Zait et al. | |
| 10,193,943 B2 * | 1/2019 | Lau .................. | H04M 15/71 |
| 2002/0147766 A1 | 10/2002 | Vanska et al. | |
| 2002/0190725 A1 | 12/2002 | Craven | |
| 2003/0128674 A1 | 7/2003 | Kong et al. | |
| 2004/0114605 A1 | 6/2004 | Karaoguz et al. | |
| 2004/0119814 A1 | 6/2004 | Clisham et al. | |
| 2004/0213259 A1 | 10/2004 | Porter | |
| 2004/0242203 A1 | 12/2004 | Lipsanen et al. | |
| 2006/0036949 A1 | 2/2006 | Moore et al. | |
| 2006/0206617 A1 | 9/2006 | Rey et al. | |
| 2007/0091843 A1 | 4/2007 | Patel et al. | |
| 2007/0130610 A1 | 6/2007 | Aarnio | |
| 2007/0133412 A1 | 6/2007 | Hutter et al. | |
| 2007/0133603 A1 | 6/2007 | Weaver et al. | |
| 2007/0136772 A1 | 6/2007 | Weaver et al. | |
| 2007/0189300 A1 | 8/2007 | Bellora et al. | |
| 2007/0258465 A1 | 11/2007 | Ma et al. | |
| 2008/0040226 A1 | 2/2008 | Roker | |
| 2008/0070550 A1 | 3/2008 | Hose | |
| 2008/0091824 A1 | 4/2008 | Patel et al. | |
| 2008/0195664 A1 | 8/2008 | Maharajh et al. | |
| 2008/0279112 A1 | 11/2008 | Schryer et al. | |
| 2009/0068991 A1 | 3/2009 | Aaltonen et al. | |
| 2009/0282162 A1 | 11/2009 | Mehrotra et al. | |
| 2010/0058401 A1 | 3/2010 | Beyabani | |
| 2010/0066808 A1 | 3/2010 | Tucker et al. | |
| 2010/0085942 A1 | 4/2010 | Oota et al. | |
| 2010/0159924 A1 | 6/2010 | Lagerman et al. | |
| 2010/0161387 A1 | 6/2010 | Harrang et al. | |
| 2010/0162297 A1 | 6/2010 | Lewis et al. | |
| 2010/0179987 A1 | 7/2010 | Sebastian et al. | |
| 2010/0254368 A1 | 10/2010 | Yamaura | |
| 2010/0312623 A1 | 12/2010 | Almodovar Herraiz et al. | |
| 2011/0167170 A1 | 7/2011 | Kovvali et al. | |
| 2011/0231551 A1 | 9/2011 | Hassan et al. | |
| 2012/0054809 A1 | 3/2012 | Chowdhury et al. | |
| 2012/0092435 A1 | 4/2012 | Wohlert | |
| 2012/0120800 A1 * | 5/2012 | Lientz .................. | H04L 67/2814 |
| | | | 370/235 |
| 2012/0209753 A1 | 8/2012 | Hodges | |
| 2012/0311068 A1 | 12/2012 | Gladwin et al. | |
| 2013/0031279 A1 | 1/2013 | Venugopal et al. | |
| 2013/0083761 A1 | 4/2013 | Pandey | |
| 2013/0097674 A1 | 4/2013 | Jindal et al. | |
| 2013/0100228 A1 | 4/2013 | Tapia et al. | |
| 2013/0223509 A1 | 8/2013 | Tweedale et al. | |
| 2013/0231080 A1 * | 9/2013 | Cheuk .................. | H04M 15/844 |
| | | | 455/405 |
| 2013/0231081 A1 | 9/2013 | Mo et al. | |
| 2013/0254345 A1 | 9/2013 | Kook et al. | |
| 2013/0318252 A1 | 11/2013 | Bulava | |
| 2014/0003450 A1 * | 1/2014 | Bentley .................... | H04N 7/15 |
| | | | 370/468 |
| 2014/0146822 A1 | 5/2014 | Janardhanan et al. | |
| 2014/0177497 A1 | 6/2014 | Backholm et al. | |
| 2014/0181850 A1 | 6/2014 | Weaver et al. | |
| 2014/0204740 A1 | 7/2014 | Tokutsu et al. | |
| 2014/0269677 A1 | 9/2014 | Fighel et al. | |
| 2015/0003264 A1 | 1/2015 | Ma | |
| 2015/0032883 A1 | 1/2015 | Chandrashekar | |
| 2015/0088710 A1 * | 3/2015 | Short ..................... | H04L 41/22 |
| | | | 705/34 |
| 2015/0112830 A1 | 4/2015 | Boulter et al. | |
| 2015/0113554 A1 | 4/2015 | Stern | |
| 2015/0195150 A1 | 7/2015 | Ritter et al. | |
| 2015/0237490 A1 | 8/2015 | Chang et al. | |
| 2015/0281395 A1 | 10/2015 | Pandiarajan et al. | |
| 2015/0341491 A1 | 11/2015 | Lau et al. | |
| 2016/0014630 A1 | 1/2016 | Xu et al. | |
| 2016/0066276 A1 | 3/2016 | Su et al. | |
| 2016/0103589 A1 | 4/2016 | Dziuk | |
| 2016/0192296 A1 | 6/2016 | Rehan et al. | |
| 2016/0248916 A1 | 8/2016 | Payne, III et al. | |
| 2016/0301582 A1 | 10/2016 | Arndt et al. | |
| 2017/0093942 A1 | 3/2017 | Danielsson et al. | |
| 2017/0134459 A1 | 5/2017 | Shetty et al. | |
| 2017/0171775 A1 | 6/2017 | Vagelos | |
| 2017/0214804 A1 | 7/2017 | Payne, III et al. | |
| 2017/0230292 A1 | 8/2017 | Lau | |
| 2018/0077292 A1 | 3/2018 | Ringberg et al. | |
| 2018/0220276 A1 | 8/2018 | Senarath et al. | |
| 2018/0220277 A1 | 8/2018 | Senarath et al. | |
| 2019/0007376 A1 | 1/2019 | Norrman et al. | |
| 2019/0141103 A1 | 5/2019 | Lau et al. | |

FOREIGN PATENT DOCUMENTS

| | | |
|---|---|---|
| CN | 103220377 | 7/2013 |
| CN | 103222306 | 7/2013 |
| CN | 103248474 | 8/2013 |
| CN | 103348312 A1 | 10/2013 |
| EP | 2858303 | 4/2015 |
| WO | WO2012172430 | 12/2012 |
| WO | WO2018089227 | 5/2018 |

OTHER PUBLICATIONS

The Chinese Office Action dated Mar. 4, 2020 for Chinese Patent Application No. 201680065278.4, a counterpart of U.S. Pat. No. 10,193,943, 10 pages.

(56) References Cited

OTHER PUBLICATIONS

The Chinese Office Action dated Mar. 4, 2020 for Chinese Patent Application No. 201680065278.4, a counterpart of U.S. Pat. No. 10,193,943, 12 pages.
Eisenach, "The Economics of Zero Rating", NERA Economic Consulting, Insight in Economics, Mar. 2015, pp. 1-16.
The Partial Supplementary European Search Report dated Mar. 1, 2019 for European Patent Application No. 16864787.3, 12 pages.
The Extended European Search Report dated Jun. 26, 2019 for European Patent Application No. 17767120.3, 7 pages.
The Extended European Search Report dated Jun. 5, 2019 for European Patent Application No. 16864787.3, 10 pages.
The Extended European Search Report dated Jul. 3, 2019 for European Patent Application No. 17750581.5, a counter part of U.S. Appl. No. 15/018,649, 8 pages.
Killoran, "Why does YouTube on Firefox offer so few quality options even if the video can be viewed in higher quality on Chrome or when it is embedded?", retrieved on Sep. 19, 2018 at <<https://support.mozilla.org/en-US/questions/1006250>>, 2014.
Low, "How to Turn off T-Mobile's Binge on and Why You'd Want to—How to Turn off T-Mobile's Binge on", retrieved on May 20, 2016, available at <<http://www.tomsguide.com/us/how-to-turn-off-bingeon,review-3330.html>>. May 17, 2016, 12 pages.
Michaels, "YouTube Finally Joins T-Mobile's Binge on", retrieved on May 20, 2016, available at: <<http://www.tomsguide.com/us/youtube-joins-binge-on,news-22431.html>>, May 17, 2016, 2 pages.
Office Action for U.S. Appl. No. 15/018,649, dated Aug. 25, 2017, Lau, "Dynamic Network Rate Control", 27 pages.
Office Action for U.S. Appl. No. 15/018,649, dated Oct. 18, 2019, Lau, "Dynamic Network Rate Control", 41 pages.
Office Action for U.S. Appl. No. 15/018,649 dated Nov. 14, 2018, Lau, "Dynamic Network Rate Control", 33 pages.
Office Action for U.S. Appl. No. 14/936,495, dated Mar. 5, 2018, Lau, "Data-Plan-Based Quality Setting Suggestions and Use Thereof to Manage Content Provider Services", 4 pages.
Office Action for U.S. Appl. No. 15/214,033, dated Apr. 2, 2018, Shetty, "Preference-Aware Content Streaming I", 15 pages.
Office Action for U.S. Appl. No. 15/018,649, dated Apr. 2, 2019, Lau, "Dynamic Network Rate Control", 39 pages.
Office Action for U.S. Appl. No. 14/936,495, dated Jun. 18, 2018, Lau, "Data-Plan-Based Quality Setting Suggestions and Use Thereof to Manage Content Provider Services", 12 pages.
Office Action for U.S. Appl. No. 15/018,649, dated Jun. 25, 2019, Lau, "Dynamic Network Rate Control", 40 pages.
Office Action for U.S. Appl. No. 15/018,649, dated Aug. 25, 2017, Lau, "Dynamic Network Rate Control", 23 pages.
Office Action for U.S. Appl. No. 16/235,892, dated Sep. 20, 2019, Lau, "Data-Plan-Based Quality Setting Suggestions and Use Thereof to Manage Content Provider Services", 11 pages.
Office Action for U.S. Appl. No. 15/214,033, dated Sep. 25, 2018, Shetty et al., "Preference-Aware Content Streaming", 17 pages.
The PCT Search Report and Written Opinion dated Feb. 2, 2017 for PCT application No. PCT/US2016/059899, 13 pages.
PCT Search Report and Written Opinion dated May 15, 2017 for PCT Application No. PCT/US17/15947, 9 pages.
PCT Search Report and Written Opinion dated May 17, 2017 for PCT Application No. PCT/US17/16990, 14 pages.
Terzis et al., "Announcing the Mobile Data Plan API", retrieved on Apr. 28, 2016, available at: <<http://youtube-eng.blogspot.com/2016/04/announcing-mobile-data-plan-api.html>>, Apr. 27, 2016, 4 pages.
Youtube, "Mobile Data Plan API", retrieved on Apr. 28, 2016, available at: <<https://docs.google.com/document/d/1LU3qzT-vpK38P2DKF-hLJIXV3hWo_fDPRB00WZUIK_4/edit?pref=2&pli=1>>, 20 pages.
"YouTube—Broadcast Yourself." May 22, 2010. Retrieved Jan. 4, 2019, from <<https://web.archive.org/web/20100522050653/https://www.youtube.com/create_account>>, 1 pg.
The European Office Action dated May 27, 2020 for European Patent Application No. 17767120.3, a counterpart of U.S. Pat. No. 10,305,952, 5 pages.
European Office Action dated Nov. 27, 2020 for European Patent Application No. 17750581.5, a counterpart foreign application of U.S. Pat. No. 10,728,152, 6 pages.
European Office Action dated Feb. 3, 2021 for European Patent Application No. 16864787.3, a counterpart foreign application of U.S. Pat. No. 10,193,943, 4 pages.
The Chinese Office Action dated Aug. 25, 2020 for Chinese Patent Application No. 201680065278.4, a counterpart of U.S. Pat. No. 10,193,943, 6 pages.
Office Action for U.S. Appl. No. 15/018,649, dated Feb. 15, 2018, Lau, "Dynamic Network Rate Control", 27 pages.

\* cited by examiner

DATA-PLAN-BASED QUALITY SETTING SUGGESTIONS AND USE THEREOF TO MANAGE CONTENT PROVIDER SERVICES

CROSS REFERENCE TO RELATED APPLICATION

This application is a continuation of, and claims priority to, U.S. patent application Ser. No. 16/235,892, filed on Dec. 28, 2018, entitled "Data-Plan-Based Quality Setting Suggestions and Use Thereof to Manage Content Provider Services," which is a divisional of, and claims priority to, U.S. patent application Ser. No. 14/936,495, filed on Nov. 9, 2015, now known as U.S. Pat. No. 10,193,943, issued on Jan. 29, 2019, entitled "Data-Plan-Based Quality Setting Suggestions and Use Thereof to Manage Content Provider Services," both of which are fully incorporated by reference herein.

BACKGROUND

Whether streaming video or music, or downloading a program or song for later viewing, the trend towards increased content consumption on user devices continues. Such content is frequently received at user devices after being transmitted across a cellular network, straining both radio frequency resources at access networks and core network resources. To manage the demands on these network resources, operators of cellular networks often include content consumption limits in user data plans. These limits are expressed in a data measurement (e.g., a number of gigabytes) for a time period (e.g., a month). For many users, however, it is quite difficult to measure or understand their content consumption against these limits. How much data will streaming that movie consume? Will it matter if the video quality is better or worse? Users without a deep understanding of the underlying technology may struggle to answer such questions. Even users that understand the technology may not know how the content provider selects service quality. Thus, users may have difficulty managing their content consumption.

Also, third party content providers often complicate the issue by automatically defaulting to the highest service quality for the content that they deliver, by making it difficult to find a control for service quality (or not offering one), or by embedding content from other third party content providers within the content that they deliver. In such circumstances, often the only control the user has is whether to consume the content at all; an ability to save resources by reducing service quality is absent.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
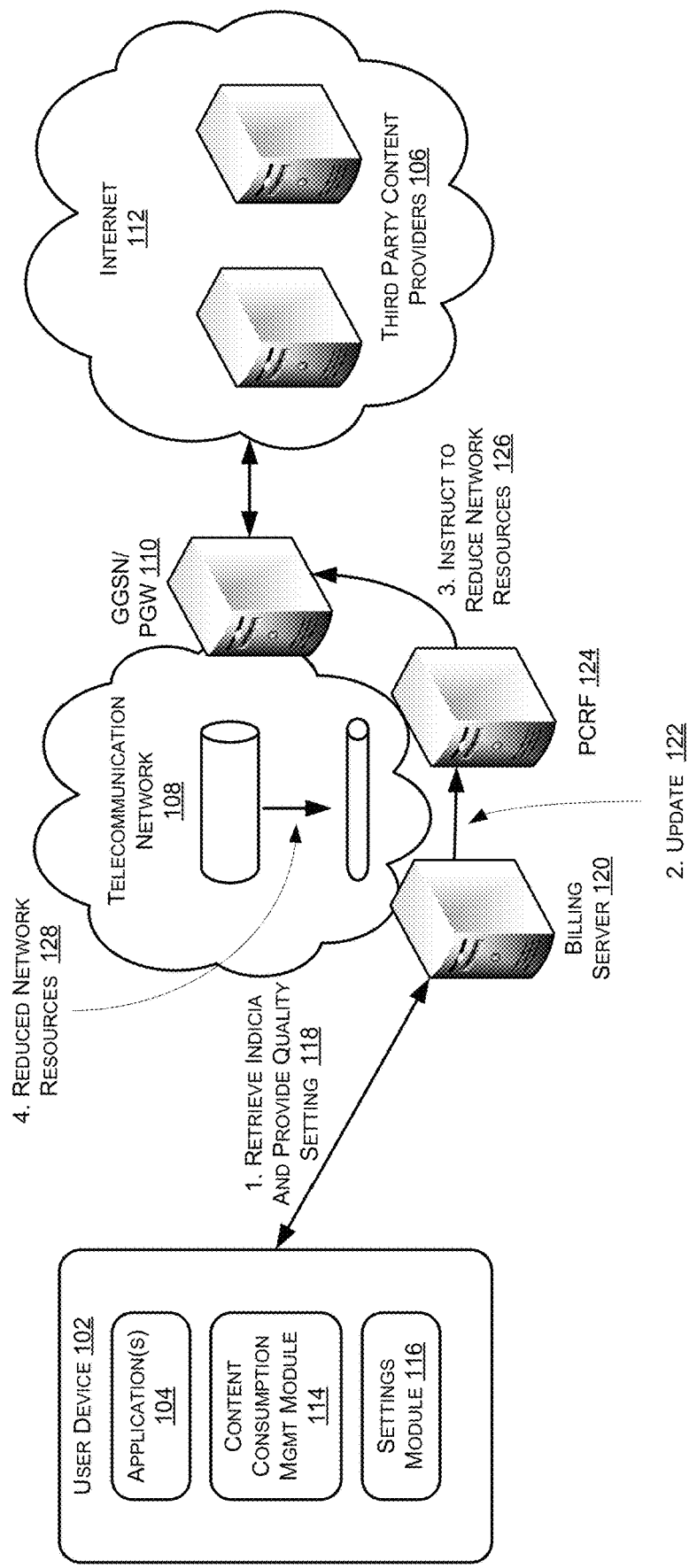
FIG. 1 illustrates an overview and example environment, including a user device, devices of a telecommunication network, and content providers, the user device and the devices of the telecommunication network managing content provider services based on a user-selected quality setting.

This disclosure describes, in part, a user device that suggests a change to a quality setting associated with the consumption of content from one or more content providers. The change is suggested based both on a user's data plan and on a service quality of content received by the user device. This user-selected quality setting is then provided to the telecommunication network, which reduces network resources available for transmission of the content based on the quality setting. Such reduced network resources cause the content providers to provide content at a service quality no greater than the quality setting. Also, the user may be presented with or defaulted to selecting an option for a program offering consumption of the video content free of charge when provided to the user at a limited service quality. When the user participates, consumption of video content is then conditionally excluded from a consumption metric of the data plan.

In various implementations, the user device may be configured with application(s) and a content consumption management module. The application(s) may receive content from third party content providers (also referred to herein simply as "content providers") and may render the content based on a service quality. Such a service quality may reflect a data transfer rate at which the content is received over the telecommunication network or a content resolution. Responsive to the application(s) receiving or rendering the content, the content consumption management module may retrieve indicia from the telecommunication network about the service quality associated with the content and about the user's content consumption plan. Based on those indicia, the content consumption management module may provide a suggestion to the user to change a quality setting associated with consumption of the content. For example, content consumption management module may determine based on the indicia that if the user continues to consume content at the current service quality, the user will exceed his or her content consumption plan limit within an hour. Responsive to that determination, the content consumption management module may suggest that the user select a quality setting which will enable the user to instead consume content for a longer duration at an acceptable service quality based on the user device being used and a type of the content. Such suggestions may be provided in a user interface, such as an overlay user interface, along with a selectable control that enables the user to effect the change to the quality setting. Alternatively or additionally, the selectable control may be provided by a different module, such as a settings module, which may allow the user to preemptively select the quality setting before receiving any suggestion to do so. Once a quality setting is selected, the user device may provide that setting to a device of the telecommunication network, such as a billing server or a policy and charging rules function (PCRF) node.

Upon receiving a quality setting, either from the billing server or directly from the user device, the PCRF node may determine whether network resources associated with transmission of the content should be reduced. Upon determining that the network resources should be reduced, the PCRF node may instruct a gateway general packet radio service (GPRS) support node (GGSN) or a packet data network gateway (PGW) to reduce the network resources. Such a reduction of network resources will in turn cause the third party content providers to reduce the service quality at which they provide content, effectively causing the third party content providers to adapt content delivery to the specific quality setting.

In further implementations, the billing server may receive an indication that a user is consuming content and, in response, may determine whether the user has elected to participate in a program offering consumption of the content free of charge in exchange for the content being provided to the subscriber at a limited service quality. If the user is participating in the program, the billing server may conditionally exclude the consuming of the video content from a content consumption metric of the content consumption plan.

Overview

FIG. 1 illustrates an overview and example environment, including a user device, devices of a telecommunication network, and content providers, the user device and the devices of the telecommunication network managing content provider services based on a user-selected quality setting. As illustrated, a user device 102 may include application(s) 104 which receive content from third party content providers 106 over a telecommunication network 108. The third party content providers 106 may be connected to the telecommunication network 108 through a GGSN/PGW 110 and the Internet 112. The user devices 102 also include a content consumption management module 114 and a settings module 116. The content consumption management module 114 may retrieve, at 118, indicia of service quality and consumption plan usage and provide a user-selected quality setting to a billing server 120 of the telecommunication network 108. The billing server 120 may then update, at 122, a PCRF node 124 of the telecommunication network 108 with the quality setting and other user metrics. At 126, the PCRF node 124 may then instruct the GGSN/PGW 110 to reduce network resources and, at 128, based on the quality setting, the GGSN/PGW 110 may reduce the network resources available for transmission of the content from the third party content providers 106, causing the third party content providers 106 to reduce service quality to no more than the quality setting.

Figure 2:
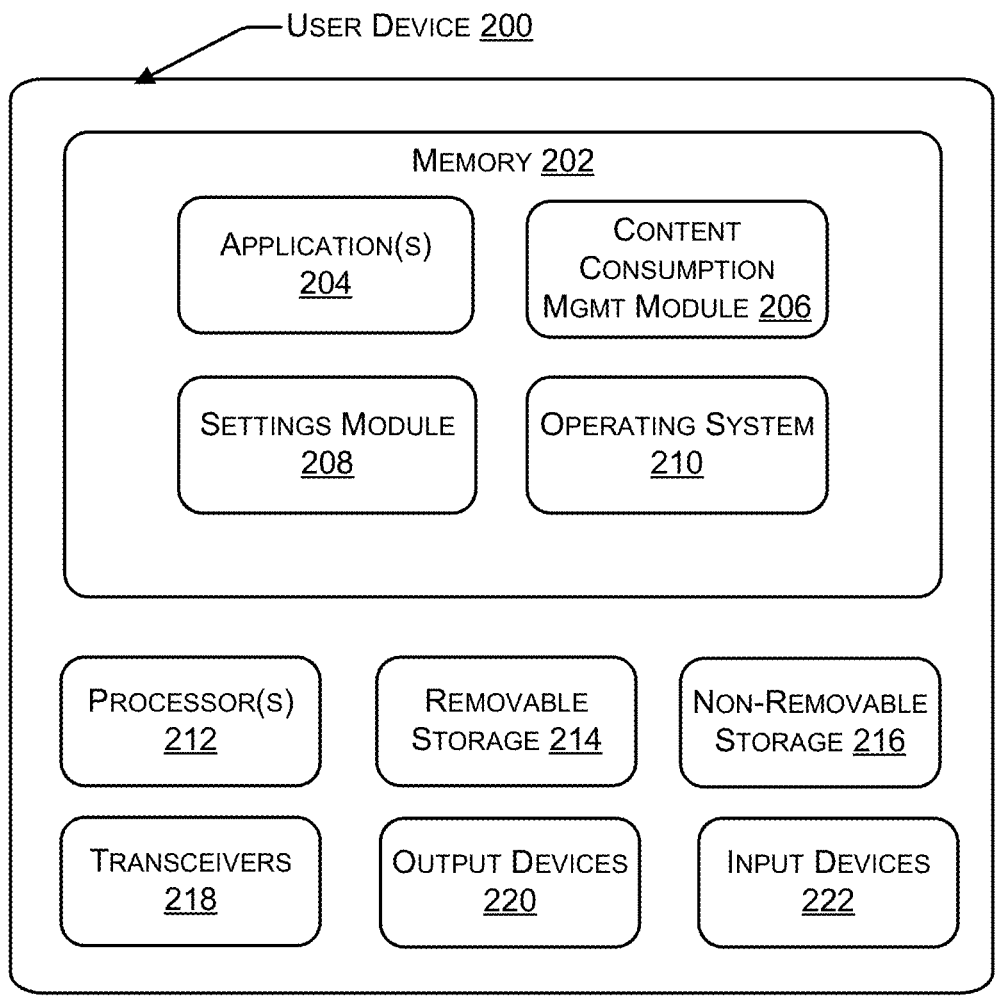
FIG. 2 illustrates a component level view of a user device configured to monitor a user's content consumption and to suggest a reduced quality setting for that content to avoid exceeding a content consumption limit imposed by the user's data plan.

In various implementations, the user device 102 may be any sort of mobile telecommunication device. Such a mobile device may be or include a cellular phone, a smart phone, a tablet computer, a personal computer (PC), a laptop computer, a desktop computer, a workstation, a media player, an accessory device, or any other sort of device or devices. The user device 102 may be associated with a specific telecommunication network, such as telecommunication network 108, as the user of the user device 102 may subscribe to services offered by an operator of the telecommunication network 108. An example user device 102 is illustrated in FIG. 2 and is described in detail below with reference to that figure.

Figure 3:
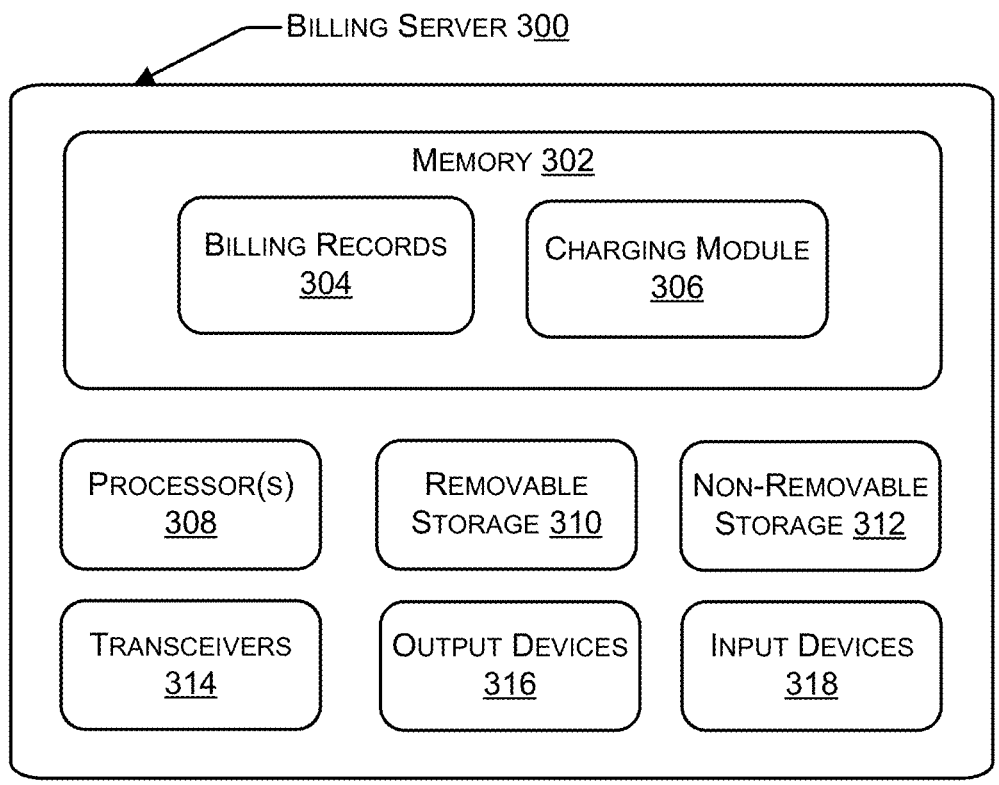
FIG. 3 illustrates a component level view of a billing server configured to store indicia of whether a subscriber has elected to participate in a program offering free data consumption and to conditionally exclude content consumption from a content consumption metric based on the indicia.
Figure 4:
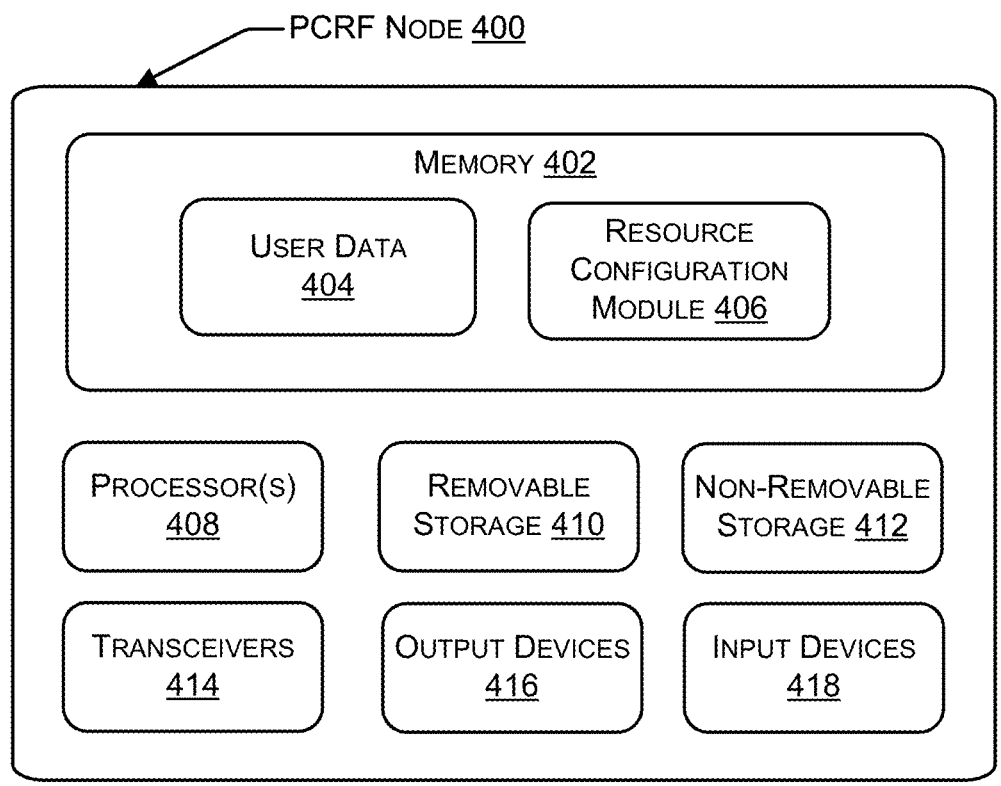
FIG. 4 illustrates a component level view of a policy and charging rules function (PCRF) node configured to receive a quality setting associated with the consumption of video content and, based on the quality setting, instruct a device of the telecommunication network to reduce the network resources available for consumption of video content.

In various implementations, each of the third party content providers 106, the GGSN/PGW 110, the billing server 120, and the PCRF node 124 may be or include one or more computing devices. Such computing devices may each be or include a server or server farm, multiple, distributed server farms, a mainframe, a work station, a PC, a laptop computer, a tablet computer, an embedded system, or any other sort of device or devices. In one implementation, ones of such computing devices represent a plurality of computing devices working in communication, such as a cloud computing network of nodes. An example billing server 120 is illustrated in FIG. 3 and is described in detail below with reference to that figure. An example PCRF node 124 is illustrated in FIG. 4 and is described in detail below with reference to that figure.

The telecommunication network 108 may be any sort of telecommunication network and may comprise a core network and multiple access networks. Such a core network may include a number of network components providing connectivity between cell sites of the telecommunication network, between cell sites of the telecommunication network and those of other telecommunication networks, and between cell sites and devices of other networks. The core network may support packet-switched communications, circuit-switched communications, or both. Further, the core network may be a System Architecture Evolution (SAE) core network or a universal mobile telecommunication system (UMTS) core network, or may include network components from both. Also, the core network may include an Internet Protocol (IP) Multimedia subsystem (IMS) layer for supporting packet-switched communications. Further, the core network may include the billing server 120, PCRF node 124, and GGSN/PGW 110, as well as other devices.

In some implementations, each access network of the telecommunication network 108 may include a number of base stations associated with a geographic area. Such base stations may be implemented on cell towers and may each be associated with one or more radio access technologies (RATs). A base stations may be, for instance, an eNode B associated with Long-Term Evolution (LTE) RAT, a Node B associated with Fourth Generation (4G) or Third Generation (3G) RATs (e.g., UMTS or Global System for Mobility (GSM) RATs), or other sorts of base station, such as a base stations associated with Second Generation (2G) RATs.

In various implementations, the user device 102 may include application(s) 104 that are capable of receiving and rendering content. Such application(s) 104 may include those capable of streaming video content, such as a web browser and client applications of various video streaming services (e.g., Netflix™, Hulu™, YouTube™, etc.). Also or instead, the application(s) 104 may include those capable of streaming audio or those capable of downloading and storing video or audio. The content received by the application(s) 104 may be associated with a service quality, such as a content resolution or a data transfer rate at which the content was received. Further, each of the application(s) 104 may offer a provider-specific quality setting (which differs from the user-selected quality setting discussed throughout this disclosure) which may effect the service quality at which the content provider 106 corresponding to that application 104 provides its content.

As illustrated in FIG. 1, the user device 102 may also be configured with a content consumption management module 114. The content consumption management module 114 may monitor execution activities on the user device 102 exposed by an operating system of the user device 102 to determine when the application(s) 104 are receiving or rendering content. Upon determining that an application 104 is rendering content, the content consumption management module 114 may retrieve, at 118, information associated with that content consumption from the telecommunication network 108. For example, the content consumption management module 114 may retrieve indicia of a service quality for content received by the application 104, a content consumption limit associated with a data plan (also referred to herein as a "content consumption plan") of a user of the user device 102, and a content consumption metric for a total amount of content consumed in a time period. In some implementations, the indicia may also include a usage history detailing the user's past content consumption behavior. The content consumption management module 114 may retrieve the indicia from the PCRF node 124 or from the billing server 120. Such retrieval may be responsive to the rendering of content by an application 104 or may be automatic and periodic.

Upon retrieving the indicia, the content consumption management module 114 may determine whether to suggest to the user that the user change a quality setting. The quality setting may specify a service quality for both the content and all other content of a same type as the content, regardless of the providing service or application. In making this determination, the content consumption management module 114 may look to the current service quality associated with the content rendered by the application(s) 104, data plan metrics and limits, usage history, and a device type of the user device 102. This information may be analyzed using a rule set received from the operator of the telecommunication network 108. Such a rule set may be updateable, allowing the operator to dynamically manage its network resources.

For example, the content consumption management module 114 may look at a current service quality, which may be a fairly high data transfer rate, and at the user's data plan limit and metrics and determine that the user will exceed the limit within another hour of content consumption. The content consumption management module 114 may act on this determination by suggesting to the user that the user select a lower quality setting for the service quality, thus obtaining additional time for content consumption before the limit is exceeded. Alternatively, the content consumption management module 114 may also consider a device type and usage history. If the current service quality is the minimal level necessary for a good user experience given the device type, the content consumption management module 114 may refrain from suggesting a quality setting change. Further, if the usage history shows that the user only consumes a single hour of content per plan time period, the content consumption management module 114 may predict only a single hour of content consumption and no change to the quality setting may be necessary. Thus, the content consumption management module 114 may refrain from suggesting one.

In some implementations, the content consumption management module 114 may provide the suggestion to change the quality setting to the user via an overlay user interface. Such an overlay user interface may be provided along with a user interface of the application(s) 104 (e.g., on an edge of the user interface of the application(s) 104). The overlay user interface may include text explaining the suggestion (e.g., "at your current rate of 6 Mbps, we estimate you will exceed your plan limit in one hour—at 1.5 Mbps, we estimate you will have six hours left—would you like to change your quality setting?") and, optionally, a selectable control to effect the change to the quality setting (e.g., a drop down list or the like). In one example, the overlay user interface may offer an option to consume content at a service quality such that the content consumption limit is met, but not exceeded. In further examples, the overlay user interface may provide the user with an option to upgrade his or her plan to enable longer enjoyment of the content at the same service quality.

In further implementations, the settings module 116 may also or instead offer a selectable control to enable the user to effect a change to the quality setting. For example, the settings module 116 may provide a settings user interface that enables the user to select among multiple possible settings for a content type (e.g., high/medium/low for video content). The settings user interface may also include selectable controls for selecting quality settings for other content types (e.g., audio content). The settings module 116 and settings user interface may also enable a user to opt in or out of a program for free or reduced charge data consumption.

Once the user has changed the quality setting via the overlay user interface or settings user interface, the content consumption management module 114 or settings module 116 will provide, at 118, the quality setting to the billing server 120 or PCRF node 124 for enforcement by the telecommunication network 108.

In various implementations, the PCRF node 124 may receive the quality settings directly from user devices 102 or indirectly from user devices 102, by way of the billing server 120. Such quality settings may be selected by the users, as described above, or may be default quality settings selected for the users. When received indirectly, the billing server 120 will update, at 122, the PCRF node 124 with the quality setting and its associated user device 102 or user. In response to receiving the quality setting, the PCRF node 124 will store the quality setting and instruct, at 126, the GGSN/PGW 110 to allocate, at 128, network resources in accordance with the quality setting. Such allocation may involve, for example, reducing the network resources. Alternatively, the PCRF node 124 may analyze the quality metric to determine would require reduced network resources to be achieved and, in response, may instruct, at 126, the GGSN/PGW 110 to reduce, at 128, the network resources. In some implementations, the PCRF node 1124 may receive multiple quality settings for multiple content types for a user or user device 102 and may reduce network resources for some of these content types, but not others. For example, if one content type is offered free of charge to the user, the PCRF node 124 may not instruct the GGSN/PGW 110 to reduce the network resources for that content type.

The effect of the reduced network resources is a reduction in the service quality utilized by the content providers 106. The content providers 106 each tests the network to determine if services are degraded or if there are fewer network resources and, in response to detecting degradation or fewer resources, they lower their service quality levels. In this way, by selecting a quality setting and having the telecommunication network 108 reduce network resources based on that quality setting, the user is able to have the content providers 106 essentially behave as if they are limiting their service quality based on that quality setting.

In various implementations, the operator of the telecommunication network 108 may further seek to reduce the burden placed on its network resources by incentivizing its users to utilize less of those network resources. For example, the operator may provide a program which offers consumption of the content (e.g., video content) free of charge in exchange for the content being provided to the user at a limited service quality. For example, the operator may determine that all video content consumed at a service quality at or less than a specific data transfer rate should be free when the consuming user opts to participate in the program When the user participates and the billing server 120 receives notification of consumption of content, the billing server 120 determines the user's participate and conditionally excludes that consumption from a consumption metric. For example, if the user consumes 20 MB of video content at or below the specific data transfer rate, the billing server 120 does not include those 20 MB in a content consumption metric that counts towards a plan limit.

In some implementations, however, the consuming of the video content is not excluded by the billing server 120 from the consumption metric when the consumption limit has been exceeded, regardless of whether the subscriber has elected to participate in the program. Thus, if the user has a limit of 20 GB per month, and the user is at 21 GB when electing to participate in the plan, the user's consumption of content will be included in his or her content consumption metrics unless, for instance, the user upgrades his or her plan and receives a higher limit.

Also, the user may repeatedly opt in and out of participation in the program. Initially, a user may elect to participate, and consumption at the lower service quality is not counted towards the content consumption metric. Later, the user may decide that he or she wishes to consume a program at a higher service rate and opts out of the program. Both consumption of that desired content and other consumption now count towards the content consumption metric. Later yet, the user may wish to again participate in the program, limiting the service quality he or she receives and, again, not having consumption counted towards the content consumption metric.

Example Devices

FIG. 2 illustrates a component level view of a user device configured to monitor a user's content consumption and to suggest a reduced quality setting for that content to avoid exceeding a content consumption limit imposed by the user's data plan. As illustrated, the user device 200 comprises a system memory 202 storing application(s) 204, a content consumption management module 206, a settings module 208, and an operating system 210. Also, the user device 200 includes processor(s) 212, a removable storage 214, a non-removable storage 216, transceivers 218, output device(s) 220, and input device(s) 222.

In various implementations, system memory 202 is volatile (such as RAM), nonvolatile (such as ROM, flash memory, etc.) or some combination of the two. The application(s) 204 may be examples of application(s) 104, the content consumption management module 206 may be an example of the content consumption management module 114, and the settings module 208 may be an example of the settings module 116. The operating system 210 may be any sort of operating system and may enable the content consumption management module 206 to discover whether the application(s) 204 are receiving or rendering content, as described above with regard to FIG. 1. Algorithm(s) implemented by the modules 204, 206, and 208 and by the operating system 210 is/are illustrated by the flowcharts shown in FIG. 5.

In some implementations, the processor(s) 212 is a central processing unit (CPU), a graphics processing unit (GPU), or both CPU and GPU, or any other sort of processing unit.

The user device 200 may also include additional data storage devices (removable and/or non-removable) such as, for example, magnetic disks, optical disks, or tape. Such additional storage is illustrated in FIG. 2 by removable storage 214 and non-removable storage 216.

Non-transitory computer-readable media may include volatile and nonvolatile, removable and non-removable tangible, physical media implemented in technology for storage of information, such as computer readable instructions, data structures, program modules, or other data. System memory 202, removable storage 214 and non-removable storage 216 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the user device 200. Any such non-transitory computer-readable media may be part of the user device 200.

In some implementations, the transceivers 218 include any sort of transceivers known in the art. For example, the transceivers 218 may include a radio transceiver that performs the function of transmitting and receiving radio frequency communications via an antenna. Also or instead, the transceivers 218 may include wireless modem(s) to may facilitate wireless connectivity with other computing devices. Further, the transceivers 218 may include wired communication components, such as an Ethernet port, for communicating with other networked devices.

In some implementations, the output devices 220 include any sort of output devices known in the art, such as a display (e.g., a liquid crystal display), speakers, a vibrating mechanism, or a tactile feedback mechanism. Output devices 220 also include ports for one or more peripheral devices, such as headphones, peripheral speakers, or a peripheral display.

In various implementations, input devices 222 include any sort of input devices known in the art. For example, input devices 222 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

FIG. 3 illustrates a component level view of a billing server configured to store indicia of whether a subscriber has elected to participate in a program offering free data consumption and to conditionally exclude content consumption from a content consumption metric based on the indicia. As illustrated, the billing server 300 comprises a system memory 302 storing billing records 304 and a charging module 306. Also, the billing server 300 includes processor(s) 308, a removable storage 310, a non-removable storage 312, transceivers 314, output device(s) 316, and input device(s) 318.

In various implementations, system memory 302 is volatile (such as RAM), nonvolatile (such as ROM, flash memory, etc.) or some combination of the two. The billing records 304 may include records for subscribers of the telecommunication network, user devices, or for combinations of subscribers and user devices. Such billing records 304 may include an indication of whether a subscriber or user is participating in a program offering free content consumption at a limited service quality. The billing records 304 may also include any or all of a plan limit on data consumption (e.g., 2 GB per month), a current content consumption metric (e.g., 1 GB for current month), and a service quality of content being consumed by the user of the user device, and a user-selected quality setting. The charging module 306 may determinate whether the user is participating in a free content consumption plan and conditionally exclude consumption from a metric, as described above with respect to FIG. 1. Also, either the charging module 306 or another module of the billing server 300 may provide data from the billing records 304 (e.g., to a PCRF node or user devices) and may update the billing records 304. Algorithm(s) implemented by the charging module 306 is/are illustrated by the flowcharts shown in FIG. 7.

In some implementations, the processor(s) 308 is a central processing unit (CPU), a graphics processing unit (GPU), or both CPU and GPU, or any other sort of processing unit.

The billing server 300 may also include additional data storage devices (removable and/or non-removable) such as, for example, magnetic disks, optical disks, or tape. Such additional storage is illustrated in FIG. 3 by removable storage 310 and non-removable storage 312.

Non-transitory computer-readable media may include volatile and nonvolatile, removable and non-removable tangible, physical media implemented in technology for storage of information, such as computer readable instructions, data structures, program modules, or other data. System memory 302, removable storage 310 and non-removable storage 312 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the billing server 300. Any such non-transitory computer-readable media may be part of the billing server 300.

In some implementations, the transceivers 314 include any sort of transceivers known in the art. For example, the transceivers 314 may include wired communication components, such as an Ethernet port, for communicating with other networked devices. Also or instead, the transceivers 314 may include wireless modem(s) to may facilitate wireless connectivity with other computing devices. Further, the transceivers 314 may include a radio transceiver that performs the function of transmitting and receiving radio frequency communications via an antenna.

In some implementations, the output devices 316 include any sort of output devices known in the art, such as a display (e.g., a liquid crystal display), speakers, a vibrating mechanism, or a tactile feedback mechanism. Output devices 316 also include ports for one or more peripheral devices, such as headphones, peripheral speakers, or a peripheral display.

In various implementations, input devices 318 include any sort of input devices known in the art. For example, input devices 318 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

FIG. 4 illustrates a component level view of a policy and charging rules function (PCRF) node configured to receive a quality setting associated with the consumption of video content and, based on the quality setting, instruct a device of the telecommunication network to reduce the network resources available for consumption of video content. As illustrated, the PCRF node 400 comprises a system memory 402 storing user data 404 and a resource configuration module 406. Also, the PCRF node 400 includes processor(s) 408, a removable storage 410, a non-removable storage 412, transceivers 414, output device(s) 416, and input device(s) 418.

In various implementations, system memory 402 is volatile (such as RAM), nonvolatile (such as ROM, flash memory, etc.) or some combination of the two. The user data 404 may include records for subscribers of the telecommunication network, user devices, or for combinations of subscribers and user devices. Such user data 404 may also include any or all of a plan limit on data consumption (e.g., 2 GB per month), a current content consumption metric (e.g., 1 GB for current month), and a service quality of content being consumed by the user of the user device, and a user-selected quality setting. The resource configuration module 406 may receive quality settings and, based on those settings reduce (or instruct a GGSN/PGW to reduce) network resources available for transmission of content associated with the quality settings, as described above with respect to FIG. 1. Algorithm(s) implemented by the resource configuration module 406 is/are illustrated by the flowcharts shown in FIG. 6.

In some implementations, the processor(s) 408 is a central processing unit (CPU), a graphics processing unit (GPU), or both CPU and GPU, or any other sort of processing unit.

The PCRF node 400 may also include additional data storage devices (removable and/or non-removable) such as, for example, magnetic disks, optical disks, or tape. Such additional storage is illustrated in FIG. 4 by removable storage 410 and non-removable storage 412.

Non-transitory computer-readable media may include volatile and nonvolatile, removable and non-removable tangible, physical media implemented in technology for storage of information, such as computer readable instructions, data structures, program modules, or other data. System memory 402, removable storage 410 and non-removable storage 412 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the PCRF node 400. Any such non-transitory computer-readable media may be part of the PCRF node 400.

In some implementations, the transceivers 414 include any sort of transceivers known in the art. For example, the transceivers 414 may include wired communication components, such as an Ethernet port, for communicating with other networked devices. Also or instead, the transceivers 414 may include wireless modem(s) to may facilitate wireless connectivity with other computing devices. Further, the transceivers 414 may include a radio transceiver that performs the function of transmitting and receiving radio frequency communications via an antenna.

In some implementations, the output devices 416 include any sort of output devices known in the art, such as a display (e.g., a liquid crystal display), speakers, a vibrating mechanism, or a tactile feedback mechanism. Output devices 416 also include ports for one or more peripheral devices, such as headphones, peripheral speakers, or a peripheral display.

In various implementations, input devices 418 include any sort of input devices known in the art. For example, input devices 418 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Example Processes

Figure 5:
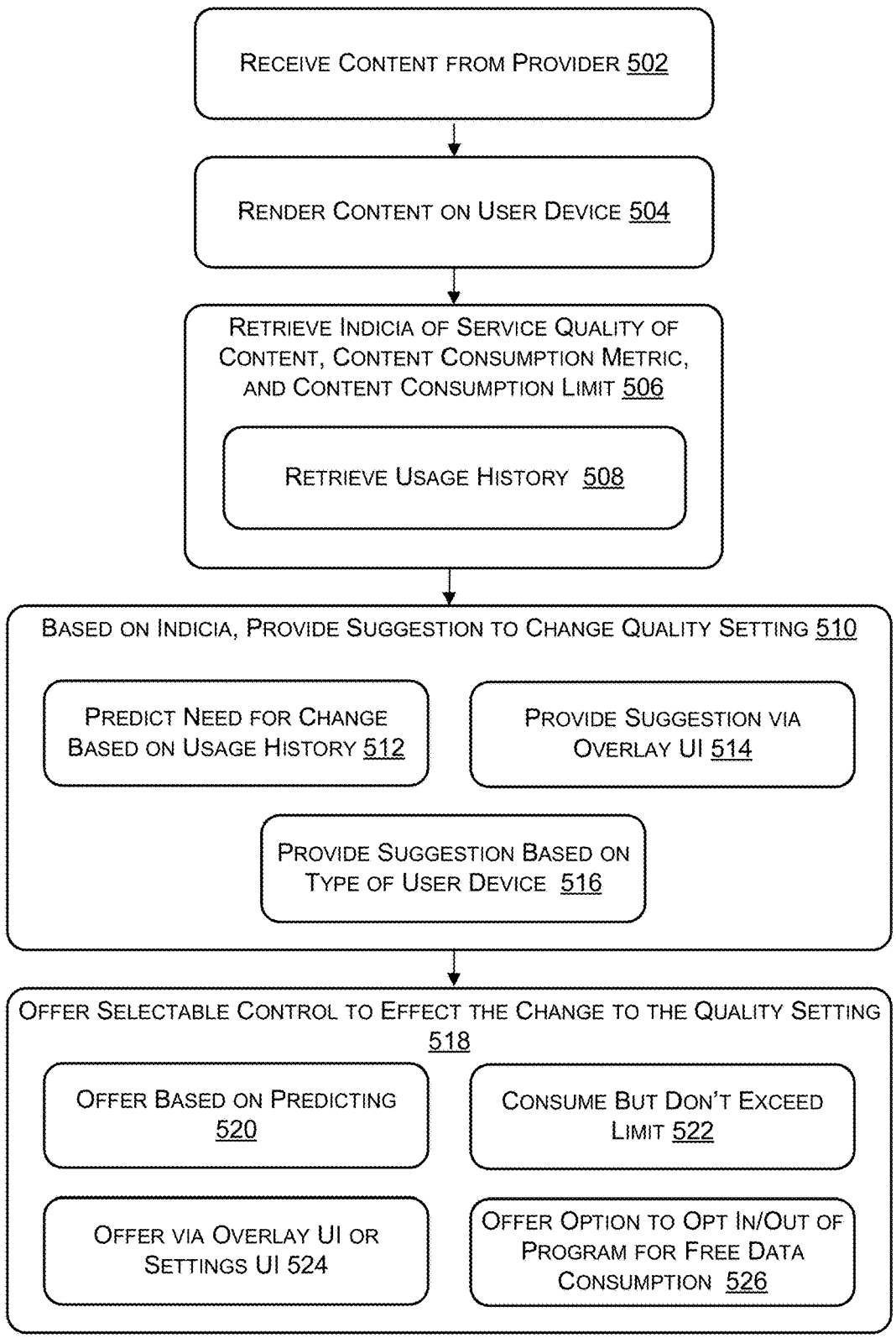
FIG. 5 illustrates an example process for retrieving indicia of a user's content consumption; based on the indicia, providing a suggestion to change a quality setting; and offering a selectable control to effect the quality setting change.
Figure 6:
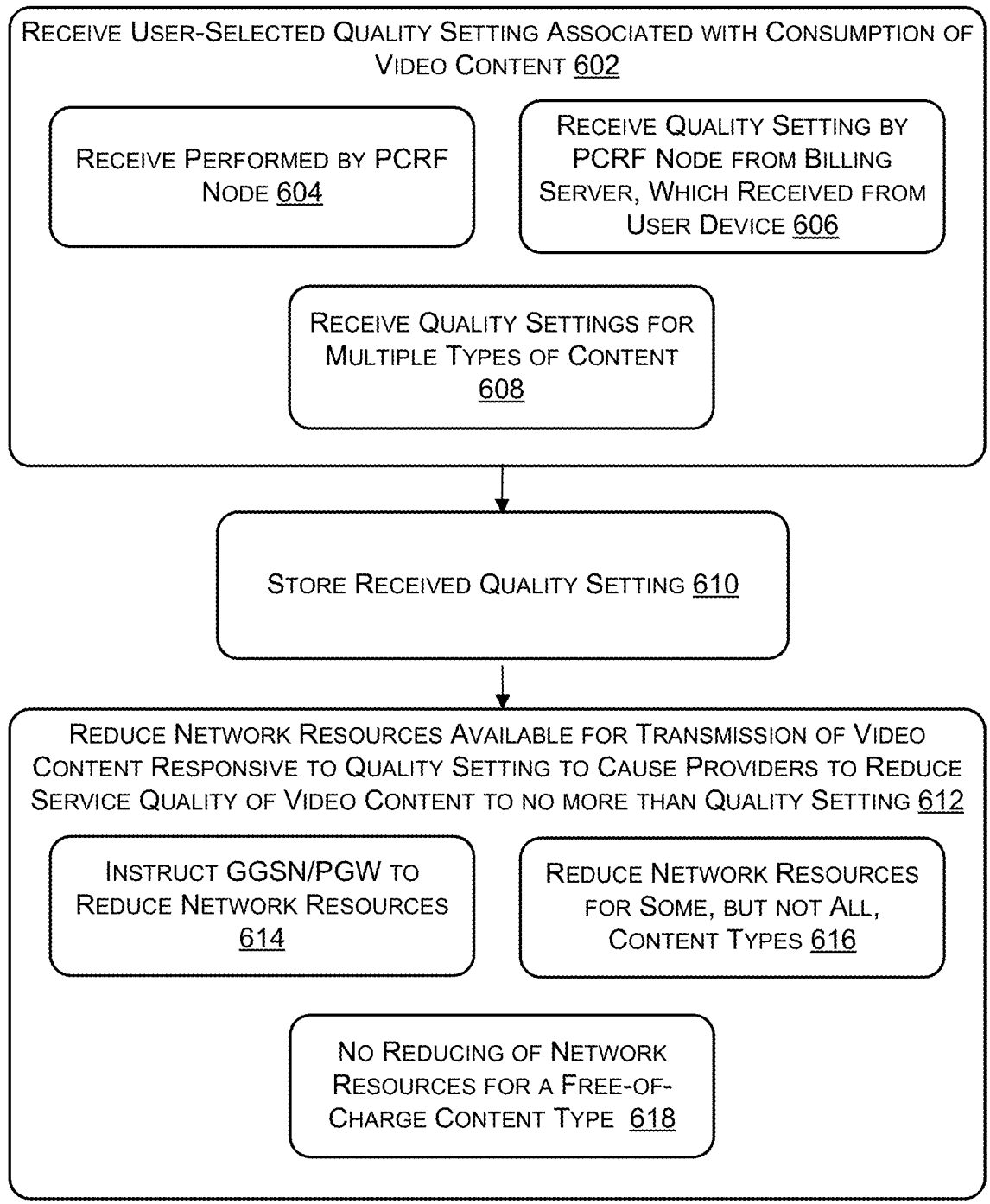
FIG. 6 illustrates an example process for receiving a quality setting associated with consumption of video content by a subscriber of the telecommunication network and reducing network resources available for transmission of video content to the subscriber, thereby causing third party content providers of video content to reduce a service quality of the video content they transmit to no more than the quality setting.
Figure 7:
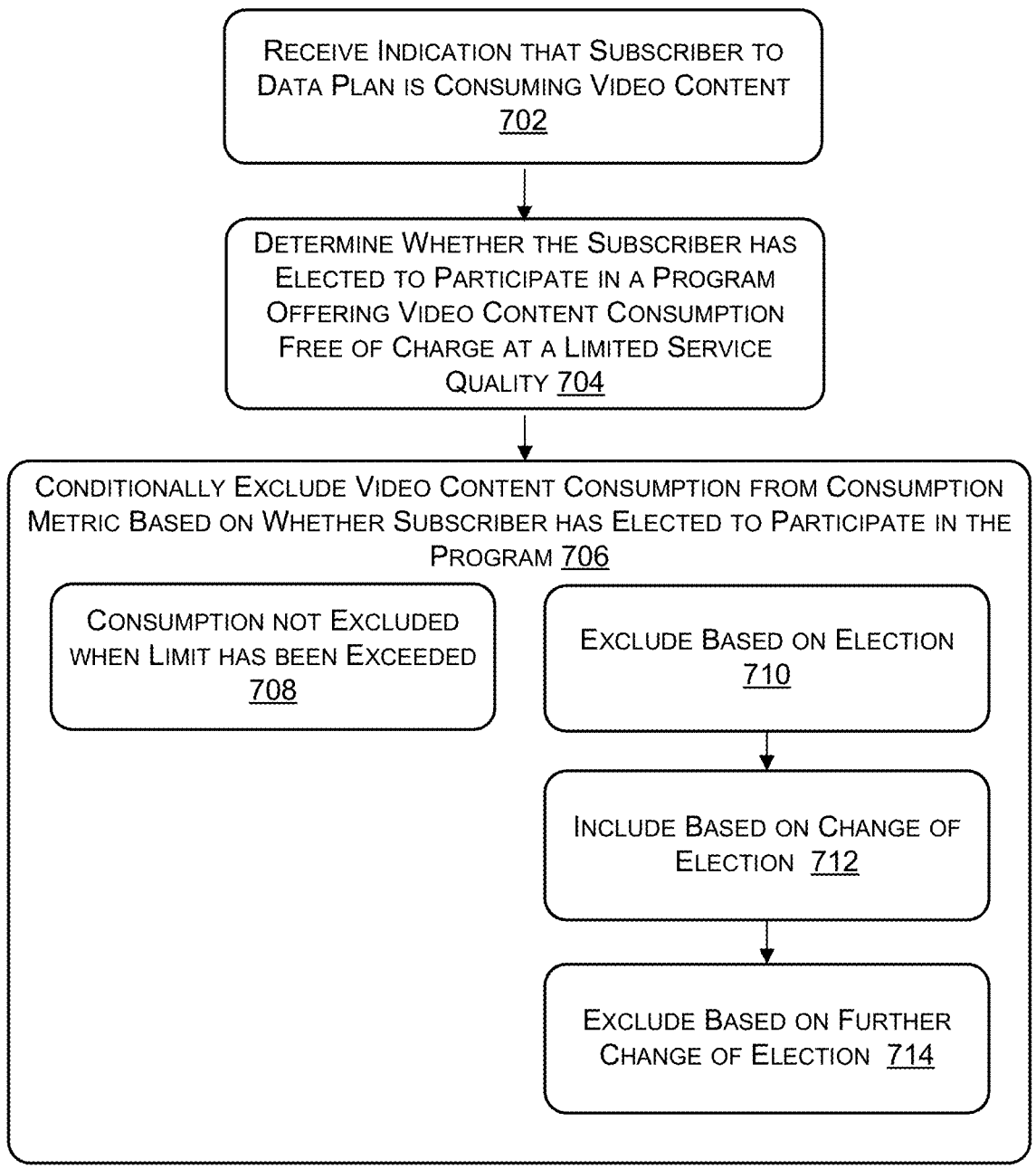
FIG. 7 illustrates an example process for conditionally excluding content consumption from a content consumption metric based on whether a subscriber has elected to participate in a program offering consumption of video content free of charge in exchange for the video content being provided to the subscriber at a limited service quality.

FIGS. 5-7 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 5 illustrates an example process for retrieving indicia of a user's content consumption; based on the indicia, providing a suggestion to change a quality setting; and offering a selectable control to effect the quality setting change. The process includes, at 502, receiving, by a user device, such as the user device 102 or 200, content at an application of the user device. The content is received from a third party content provider over a telecommunication network.

At 504, the application renders the content at a service quality associated with the received content. The service quality for the content may be one of a resolution of the content or a data transfer rate of the content.

At 506, a content consumption manager module of the user device retrieves indicia of a service quality for content received by the application, a content consumption limit associated with a data plan of a user of the user device, and a content consumption metric for a total amount of content consumed in a time period. The indicia may be retrieved from the telecommunication network (e.g., from a billing server or PCRF node of the telecommunication network) responsive to the content consumption manager module observing that the application is rendering content. At 508, the retrieving may include retrieving a usage history of the user.

At 510, the content consumption manager module provides, based at least in part on the indicia, a suggestion to change a quality setting which specifies the service quality of the content received by the application. Such a quality setting may specify a service quality for both the content and for all other content of a same type as the content, regardless of the providing service or application. At 512, providing the suggestion may include predicting, based on the usage history, whether the user's content consumption will exceed the content consumption limit before an end of the time period and providing a suggestion based on that prediction. At 514, the providing may include providing the suggestion via an overlay user interface. At 516, the providing may include providing the suggestion of the quality setting based at least in part on a device type of the user device.

At 518, the content consumption manager module offers a selectable control to effect the change to the quality setting. At 520, the offering may include offering the selectable control to effect the change based on the predicting at 512. At 522, the offering may include providing an option to consume content at a service quality such that the content consumption limit is met, but not exceeded. At 524, the offering may include offering the selectable control via an overlay user interface or via a settings user interface. At 526, the offering may include providing an option to opt in or out of a data consumption plan that doesn't charge for content consumption at or below a service quality threshold.

FIG. 6 illustrates an example process for receiving a quality setting associated with consumption of video content by a subscriber of the telecommunication network and reducing network resources available for transmission of video content to the subscriber to cause third party content providers of video content to reduce a service quality of the video content they transmit to no more than the quality setting. The process includes, at 602, receiving, by a device of the telecommunication network, a quality setting selected by a subscriber of the telecommunication network for consumption of video content by the subscriber. The quality setting may either have been selected by the subscriber or may be a default quality setting selected for the subscriber. At 604, the receiving may be performed by a PCRF node of the telecommunication network, such as a PCRF node 124 or 400. At 606, the receiving may comprise receiving the quality setting from a billing server of the telecommunication network, the billing server having received the quality setting from a user device. At 608, the receiving may comprise receiving quality settings associated with consumption of multiple corresponding types of content.

At 610, the device of the telecommunication network, such as a PCRF node 124 or 400, stores the quality setting.

At 612, the device of the telecommunication network, such as a PCRF node 124 or 400, reduces network resources available for transmission of the video content to the subscriber. This reduction causes third party content providers of video content to reduce a service quality of the video content they transmit to no more than the quality setting (e.g., limit to no more than 1 mbps). The third party content providers reduce the service quality in response to testing the telecommunication network and determining, based on the testing, that the network resources are reduced. At 614, the reducing may comprise instructing a GGSN or a PGW to reduce the network resources available for the transmission of the video content. At 616, the reducing may comprise reducing network resources responsive to some, but not all, of the quality settings when quality settings for multiple types of content are received. At 618, the reducing may include not reducing network resources responsive to receiving quality settings associated with consumption of content for which the telecommunication network does not charge.

FIG. 7 illustrates an example process for conditionally excluding content consumption from a content consumption metric based on whether a subscriber has elected to participate in a program offering consumption of video content free of charge in exchange for the video content being provided to the subscriber at a limited service quality. The process includes, at 702, a billing server of a telecommunication network, such as billing server 120 or 300, receiving an indication that a subscriber to a data plan is consuming video content.

At 704, the billing server determines whether the subscriber has elected to participate in a program offering consumption of the video content free of charge in exchange for the video content being provided to the subscriber at a limited service quality.

At 706, the billing server conditionally excludes the consuming of the video content from a consumption metric of the data plan that is associated with a consumption limit based at least in part on whether the subscriber has elected to participate in the program. At 708, the consuming of the video content is not excluded from the consumption metric when the consumption limit has been exceeded, regardless of whether the subscriber has elected to participate in the program. Further, the conditional excluding may include, at 710, excluding the consuming of the video content from the consumption metric based on the subscriber electing to participate in the program; at 712, including further consumption of video content in the consumption metric based on the subscriber changing the election to not participate in the program; and, at 714, excluding further consumption of video content from the consumption metric based on the subscriber changing the election to participate in the program again.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method comprising:
   receiving, by a policy and charging rules function (PCRF) node of a telecommunication network from a billing server of the telecommunication network, a quality setting selected by a subscriber of the telecommunication network for consumption of video content by a user device associated with the subscriber; and
   instructing, by the PCRF node and based on the quality setting, a network element of the telecommunication network to reduce network resources available for transmission of the video content to the user device,
   wherein reducing the network resources causes third party content providers of the video content to reduce a service quality of the video content transmitted to the user device to no more than the quality setting, and
   wherein the quality setting is indicated by billing records, stored at the billing server, indicating that the subscriber is associated with a program for consuming the video content, free of charge, at a limited service quality associated with the quality setting.

2. The computer-implemented method of claim 1, wherein the billing server received the quality setting from the user device.

3. The computer-implemented method of claim 1, wherein the quality setting is a default quality setting.

4. The computer-implemented method of claim 1, wherein the network element is a gateway general packet radio service (GPRS) support node (GGSN) or a packet data network gateway (PGW).

5. The computer-implemented method of claim 1, wherein the third party content providers reduce the service quality of the video content to no more than the quality setting in response to testing the telecommunication network and determining, based on the testing, that the network resources are reduced.

6. The computer-implemented method of claim 1, wherein:
   the quality setting comprises multiple quality settings associated with consumption of multiple corresponding types of content, and
   the PCRF node instructs the network element to reduce the network resources responsive to some of the multiple quality settings but does not instruct the network element to reduce the network resources responsive to others of the multiple quality settings.

7. The computer-implemented method of claim 6, wherein the PCRF node does not instruct the network element to reduce the network resources responsive to receiving at least one of the others of the multiple quality settings associated with consumption of content for which the telecommunication network does not charge.

8. The computer-implemented method of claim 1, wherein the billing server is configured to exclude consumption of the video content from a data consumption metric associated with the subscriber.

9. The computer-implemented method of claim 1, wherein the telecommunication network comprises a core network and at least one access network, and the PCRF, the billing server, and the network element are elements of the core network.

10. A policy and charging rules function (PCRF) of a telecommunication network, comprising:
    one or more processors; and
    memory storing computer-executable instructions that, when executed by the one or more processors, cause the PCRF to perform operations comprising:
      receiving, from a billing server of the telecommunication network, a quality setting selected by a subscriber of the telecommunication network for consumption of video content by a user device associated with the subscriber; and
      instructing, based on the quality setting, a network element of the telecommunication network to reduce network resources available for transmission of the video content to the user device,
    wherein reducing the network resources causes third party content providers of the video content to reduce a service quality of the video content transmitted to the user device to no more than the quality setting, and wherein the quality setting is indicated by billing records, stored at the billing server, indicating that the subscriber is associated with a program for consuming the video content, free of charge, at a limited service quality associated with the quality setting.

11. The PCRF of claim 10, wherein the billing server received the quality setting from the user device.

12. The PCRF of claim 10, wherein the network element is a gateway general packet radio service (GPRS) support node (GGSN) or a packet data network gateway (PGW).

13. The PCRF of claim 10, wherein the third party content providers reduce the service quality of the video content to no more than the quality setting in response to testing the telecommunication network and determining, based on the testing, that the network resources are reduced.

14. The PCRF of claim 10, wherein:
the quality setting comprises multiple quality settings associated with consumption of multiple corresponding types of content, and
the instructing comprises instructing the network element to reduce the network resources responsive to some of the multiple quality settings and not instructing the network element to reduce the network resources responsive to others of the multiple quality settings.

15. The PCRF of claim 14, wherein the PCRF does not instruct the network element to reduce the network resources responsive to receiving at least one of the others of the multiple quality settings associated with consumption of content for which the telecommunication network does not charge.

16. The PCRF of claim 10, wherein the quality setting is a default quality setting.

17. One or more non-transitory computer-readable media storing computer-executable instructions that, when executed by one or more processors associated with a policy and charging rules function (PCRF) of a telecommunication network, cause the PCRF to perform operations comprising:

receiving, from a billing server of the telecommunication network, a quality setting selected by a subscriber of the telecommunication network for consumption of video content by a user device associated with the subscriber; and instructing, based on the quality setting, a network element of the telecommunication network to reduce network resources available for transmission of the video content to the user device, wherein reducing the network resources causes third party content providers of the video content to reduce a service quality of the video content transmitted to the user device to no more than the quality setting, and wherein the quality setting is indicated by billing records, stored at the billing server, indicating that the subscriber is associated with a program for consuming the video content, free of charge, at a limited service quality associated with the quality setting.

18. The one or more non-transitory computer-readable media of claim 17, wherein the billing server received the quality setting from the user device.

19. The one or more non-transitory computer-readable media of claim 17, wherein:
the quality setting comprises multiple quality settings associated with consumption of multiple corresponding types of content, and
the instructing comprises instructing the network element to reduce the network resources responsive to some of the multiple quality settings and not instructing the network element to reduce the network resources responsive to others of the multiple quality settings.

20. The one or more non-transitory computer-readable media of claim 19, wherein the PCRF does not instruct the network element to reduce the network resources responsive to receiving at least one of the others of the multiple quality settings associated with consumption of content for which the telecommunication network does not charge.

* * * * *